(12) United States Patent
Haartsen

(10) Patent No.: US 11,330,652 B2
(45) Date of Patent: May 10, 2022

(54) MULTIPLE RF BAND SYSTEM WITH BAND PRIORITY SELECTION

(71) Applicant: Plantronics, Inc., Santa Cruz, CA (US)

(72) Inventor: Jacobus Cornelis Haartsen, Rolde (NL)

(73) Assignee: Plantronics, Inc., Santa Cruz, CA (US)

( * ) Notice: Subject to any disclaimer, the term of this patent is extended or adjusted under 35 U.S.C. 154(b) by 303 days.

(21) Appl. No.: 16/413,957

(22) Filed: May 16, 2019

(65) Prior Publication Data

US 2020/0367300 A1   Nov. 19, 2020

(51) Int. Cl.

| | |
|---|---|
| *H04W 76/15* | (2018.01) |
| *H04W 48/20* | (2009.01) |
| *H04W 72/04* | (2009.01) |
| *H04W 72/12* | (2009.01) |
| *H04W 72/10* | (2009.01) |

(Continued)

(52) U.S. Cl.
CPC .......... *H04W 76/15* (2018.02); *H04W 48/20* (2013.01); *H04W 72/0453* (2013.01); *H04W 72/10* (2013.01); *H04W 72/1247* (2013.01); H04W 72/087 (2013.01); H04W 92/18 (2013.01)

(58) Field of Classification Search
CPC ............. H04W 48/20; H04W 72/0453; H04W 72/087; H04W 72/10; H04W 72/1247; H04W 76/15; H04W 92/18
USPC ........................................................ 370/329
See application file for complete search history.

(56) References Cited

U.S. PATENT DOCUMENTS

| | | | |
|---|---|---|---|
| 5,260,988 | A | 11/1993 | Schellinger et al. |
| 5,907,812 | A | 5/1999 | Van De Berg |
| 6,909,737 | B1 | 6/2005 | Kockmann et al. |

(Continued)

FOREIGN PATENT DOCUMENTS

| | | |
|---|---|---|
| EP | 0767551 A2 | 4/1997 |
| RU | 2291568 C1 * | 1/2007 |

OTHER PUBLICATIONS

English translation of RU2291568C1, Jan. 2007, [Retreived from Internet on Jan. 5, 2022], Retreived from Espacenet, pp. 1-18. (Year: 2007).*

(Continued)

*Primary Examiner* — Omar J Ghowrwal
(74) *Attorney, Agent, or Firm* — Chuang Intellectual Property Law; Thomas Chuang

(57) ABSTRACT

Methods and apparatuses for multiple radio frequency band operation are described. In one example, a first device is operated in a first radio frequency band. A connection request is received at the first device from a second device utilizing the first radio frequency band. The connection request is processed to designate whether the connection request is a priority services request type or a non-priority services request type. Responsive to designating the connection request as the non-priority services request type, a non-priority services communications channel is established utilizing a second radio frequency band. Responsive to designating the connection request as a priority services request type, it is determined whether a priority services channel is available or not available in the first radio frequency band. A priority services communications channel is established utilizing the first radio frequency band or an interim non-priority services communications channel is established utilizing the second radio frequency band.

14 Claims, 11 Drawing Sheets

(51) Int. Cl.
*H04W 72/08* (2009.01)
*H04W 92/18* (2009.01)

(56) References Cited

U.S. PATENT DOCUMENTS

| | | | |
|---|---|---|---|
| 7,395,061 B2 | 7/2008 | Hundal et al. | |
| 8,583,138 B2 | 11/2013 | Cahill | |
| 8,712,467 B2 | 4/2014 | Clark et al. | |
| 9,338,784 B2 | 5/2016 | Clark | |
| 2007/0010255 A1 | 1/2007 | Liu et al. | |
| 2007/0135122 A1 | 6/2007 | Dillon et al. | |
| 2011/0092200 A1 | 4/2011 | Charbit et al. | |
| 2013/0309991 A1* | 11/2013 | Shaw | H04W 76/36 455/404.1 |
| 2016/0191093 A1 | 6/2016 | Larsen | |
| 2019/0200149 A1* | 6/2019 | Abe | H04R 29/004 |
| 2020/0037335 A1* | 1/2020 | Killadi | H04W 16/14 |
| 2021/0400570 A1* | 12/2021 | Shih | H04W 72/0453 |

OTHER PUBLICATIONS

European Search Report completed on Sep. 18, 2020 for EP Application No. 20174998 (3 pages).
European Examination Report completed on Sep. 18, 2020 for EP Application No. 20174998 (5 pages).
Samsung, "Extending the IDC Framework for LAA," 3GPP Draft; R2-154370 LAA Wi-Fi Indication_Final, 3rd Generation Partnership Project (3GPP), Mobile Competence Centre, 650, Route des Lucioles; F-06921 Sophia-Antipolis Cedex, France, Oct. 5-9, 2015, 4 pages.
Unknown, "3rd Generation Partnership Project; Technical Specification Group Radio Access Netwprok; Study on Licensed-Assisted Access to Unlicensed Spectrum, Release 13," 3GPP Draft; 36889-D00, 3rd Generation Partnership Project (3GPP), Mobile Compentence Centere, 650 Route des Lucioles, F-06921, Sophia-Antipolis Cedex, France, Jun. 2015 (87 pages).

\* cited by examiner

100

MULTIPLE RF BAND SYSTEM WITH BAND PRIORITY SELECTION

BACKGROUND OF THE INVENTION

User density in wireless communications is an important figure of merit in Enterprise systems. Achievable user density in a restricted environment depends, among other things, on the number of channels to choose from. Enterprise systems often utilize the Digital Enhanced Cordless Telecommunications (DECT) standard. DECT is a European Telecommunications Standards Institute (ETSI) standard for mobile digital telephones. DECT telephones utilize radio frequency technology in the Unlicensed Personal Communications Services (UPCS) band. In Europe, DECT uses a license-exempt UPCS band at 1880-1900 MHz.

In the United States, DECT uses a license-exempt UPCS band at 1920-1930 MHz. The 10 MHz spectrum provides five carriers. With nominally twelve slots per carrier, the number of orthogonal, two-way channels to choose from is sixty (i.e., 5×12=60). The advantage of the license-exempt DECT band is that it is protected: although no license is required, only DECT systems may be deployed in this band. Advantageously, this gives a controlled environment where system designers can anticipate on the interference behavior coming from other DECT transceivers. A disadvantage is the limited spectrum of only 10 MHz.

Due to the limited number of carrier frequencies, the density of users that can operate in a given geographic area is limited. When many users attempt simultaneous operation of their DECT devices, system failure may occur whereby the devices become inoperable. As a result, improved methods and systems for high user density wireless communications are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
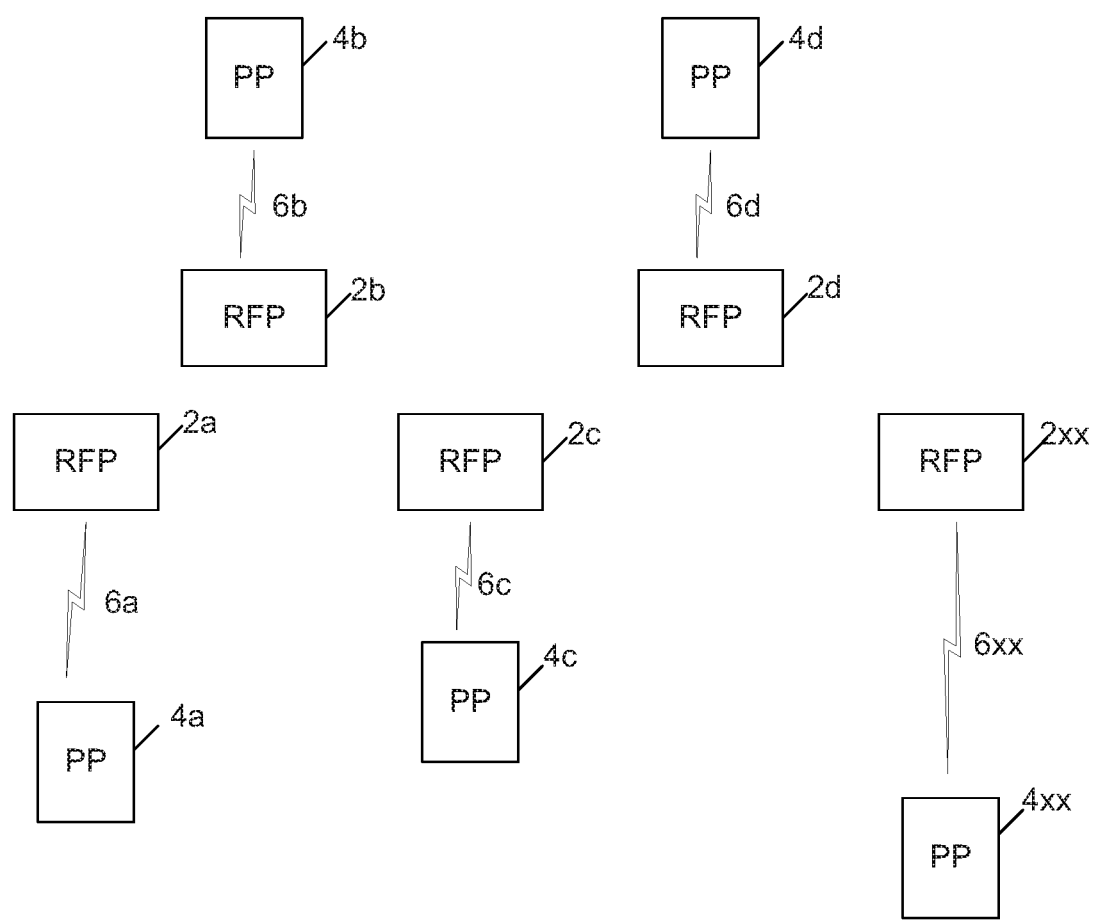
FIG. 1 illustrates a radio communication system with multiple radio fixed parts and portable parts in one example.

Methods and apparatuses for multiple radio frequency band operation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

The inventor has recognized certain limitations in current high user density DECT systems. In one example embodiment of the invention, a method for multiple radio frequency band operation includes operating a first device in a first radio frequency band. The method includes receiving a connection request at the first device from a second device utilizing the first radio frequency band. The method further includes processing the connection request to designate whether the connection request is a priority services request type or a non-priority services request type. Responsive to designating the connection request as the non-priority services request type, a non-priority services communications channel between the first device and the second device utilizing a second radio frequency band is established. Responsive to designating the connection request as a priority services request type, a priority services communications channel between the first device and the second device utilizing the first radio frequency band is established.

In one example embodiment of the invention, a method for multiple radio frequency (RF) band operation includes operating a first device in a first radio frequency band. The method includes receiving a connection request at the first device from a second device utilizing the first radio frequency band. The method includes processing the connection request to designate whether the connection request is a priority services request type or a non-priority services request type. Responsive to designating the connection request as the non-priority services request type, a non-priority services communications channel is established between the first device and the second device utilizing a second radio frequency band.

Responsive to designating the connection request as a priority services request type, it is determined whether a priority services channel is available or not available in the first radio frequency band. The method includes establishing a priority services communications channel between the first device and the second device utilizing the first radio frequency band responsive to determining the priority services channel is available in the first radio frequency band. The method further includes establishing an interim non-priority services communications channel between the first device and the second device utilizing the second radio frequency band responsive to determining the priority services channel is not available in the first radio frequency band. In one example, the first device is a radio fixed part device and the second device is a portable part device. In a further example, the first device is a portable part device and the second device is a radio fixed part device.

In one example embodiment, a first communications device includes one or more a processors, a first radio frequency band transceiver to operate the first communications device in a first radio frequency band, a second radio frequency band transceiver to operate the first communications device in a second radio frequency band, and one or more antennas. The first communications device includes one or more memories comprising computer-executable instructions stored thereon which, when executed by the one or more processors, cause the one or more processors to perform operations. The operations include operating the first communications device in a first radio frequency band. The operations include receiving a connection request at the first communications device from a second communications device utilizing the first radio frequency band, and processing the connection request to designate whether the connection request is a priority services request type or a non-priority services request type. Responsive to designating the connection request as the non-priority services request type, a non-priority services communications channel is established between the first communications device and the second communications device utilizing a second radio frequency band.

Responsive to designating the connection request as a priority services request type, it is determined whether a priority services channel is available or not available in the first radio frequency band. The operations include establishing a priority services communications channel between the first communications device and the second communications device utilizing the first radio frequency band responsive to determining the priority services channel is available in the first radio frequency band. In one example, the operations include establishing an interim non-priority services communications channel between the first communications device and the second communications device utilizing the second radio frequency band responsive to determining the priority services channel is not available in the first radio frequency band. In one example, the first communications device is a radio fixed part device and the second communications device is a portable part device. In a further example, the first communications device is a portable part device and the second communications device is a radio fixed part device.

In one example, a method for multiple radio frequency band operation includes operating a first device in a first radio frequency band. The method includes sending a connection request to a second device from the first device utilizing the first radio frequency band, the connection request comprising a priority services request type or a non-priority services request type. The method further includes establishing a non-priority services communications channel between the first device and the second device utilizing a second radio frequency band if the connection request as the non-priority services request type. Where the connection request comprises a priority services request type, the method includes one of either (a) establishing a priority services communications channel between the first device and the second device utilizing the first radio frequency band following a determination the priority services channel is available in the first radio frequency band, or (b) establishing an interim non-priority services communications channel between the second device and the first device utilizing the second radio frequency band following a determination the priority services channel is not available in the first radio frequency band. In one example, the first device is a portable part device and the second device is a radio fixed part device. In a further example, the first device is a radio fixed part device and the second device is a portable part device.

In one example of embodiment of the invention, in order to increase the achievable user density of DECT in US deployed systems, both the protected license-exempt band at 1.9 GHz and the license-free ISM band at 900 MHz are used in a single system. The ISM band at 900 MHz ranges from 902 to 928 MHz, thus providing 26 MHz of spectrum. This band is also license-free and in the past, has mainly been used for analog cordless telephony. Due to the lower frequency, better radio propagation conditions are experienced (i.e., radio transceivers can operate at lower transmit power levels and still get good range). The ISM band at 900 MHz provides 14 additional carriers, or 14×12=168 orthogonal, two-way channels. The terms license-exempt band and license-free band both point to an unlicensed band. The distinction made herein is that a license-exempt band is a protected band, dedicated to a single technology (like DECT). A license-free band is shared by different technologies (e.g., WiFi, Bluetooth, ZigBee), and any additional technology can be deployed as long as it adheres to certain restrictions like maximum output power and signal spreading.

Which band is selected is based on a number of priority criteria. For priority services (QoS), always carriers from the protected band are used. Likewise, while in IDLE mode, beacons are sent on carriers in the protected band. This means that during connection setup, protected channels are used. Portable parts (PPs) that are turned on always know where to search for beacons.

In contrast, for best-effort services like data transfer, or low-duty-cycle sensor data transfer (e.g., ultra-low energy (ULE) applications in Internet-of-things (IoT) use scenarios), and/or services that use retransmission schemes and allow more latency, the license-free band at 900 MHz is used. The lower signal attenuation at 900 MHz allows the sensors (or other typical IoT devices) to operate at lower transmit power.

Furthermore, the license-free band can be used as a back-up if congestion occurs in the protected band and the license-exempt spectrum has reached its maximum voice capacity. To be more robust in the license-free band, the voice channel could apply more robustness against interference (e.g. apply error-correction schemes or apply a more robust modulation scheme). During the connection, the system may regularly check if voice capacity becomes available in the protected band; if so, a handover is carried out wherein the channel is seamlessly moved from the license-free band to the license-exempt band.

FIG. 1 illustrates a radio communication system 100 with multiple radio fixed parts (e.g., base stations) and portable parts (e.g., mobile devices, such as headsets) in one example. The radio communication system 100 may, for example, be implemented in a telephone call center or an office environment having a high density of users. Radio fixed part (RFP) 2a, radio fixed part 2b, radio fixed part 2c, radio fixed part 2d, . . . radio fixed part 2xx are in wireless radio communication with portable part (PP) 4a, portable part 4b, portable part 4c, portable part 4d, . . . wireless link 6xx, respectively.

In one example, radio communication system 100 is a TDMA system, such as that utilized by the DECT protocol. In general, a carrier frequency in a frequency band is used by a radio fixed part in radio contact with a portable part. For example, a radio fixed part 2a transmits to a portable part 4a in a transmit time slot in a first frame on a selected carrier frequency. The portable part 4a transmits to the radio fixed part 2a in a receive time slot in a second frame on the same selected carrier frequency. Thus, during transmit time slots, radio fixed part 2a acts as a transmitter and during receive time slots radio fixed part 2a operates as a receiver. The first frame and the second frame taken together form a duplex frame.

Radio fixed parts 2a, 2b, 2c, 2d, . . . 2xx may, for example, be a landline phone, access point (AP), personal computer, USB dongle, or mobile phone. Radio fixed parts 2a, 2b, 2c, 2d, . . . 2xx are coupled to a telecommunications network. The network may be a communications network which may include a public switched telephone network (PSTN), a cellular network, an integrated services digital network (ISDN), a local area network (LAN), and/or a wireless local area network (WLAN), that support standards such as Ethernet, 802.11, and/or voice over internet protocol (VoIP).

In one example, the access point includes a transceiver and a processor configured to allow a wireless device (e.g., one of the portable parts 4a, 4b, 4c, 4d, . . . 4xx) access to a network connected to the access point (e.g., via a 10/100 Ethernet RJ-45 port). The access point may be any device that allows wireless-equipped computers and other devices to communicate with a wired network. In one example, the access point is able to support the 802.11a, 802.11b, and/or 802.11g wireless networking standards. In other examples, the access point may be able to support other wireless networking standards.

In one example operation, a connection request is received at radio fixed part 2a from portable part 4a. Alternatively, a connection request is received at portable part 4a from radio fixed part 2a. The connection request is processed to determine which RF band to operate the wireless link 6a between the portable part 4a and the radio fixed part 2a. A connection request can be received and processed at either the portable part 4a or at the radio fixed part 2a to determine which RF band to operate the wireless link 6a. If the radio fixed part 2a determines the RF band, the portable part 4a can be configured to query the radio fixed part 2a as to what the selected RF band is. If the portable part 4a determines the RF band, the radio fixed part 2a can be configured to query the portable part 4a as to what the selected RF band is.

Figure 2:
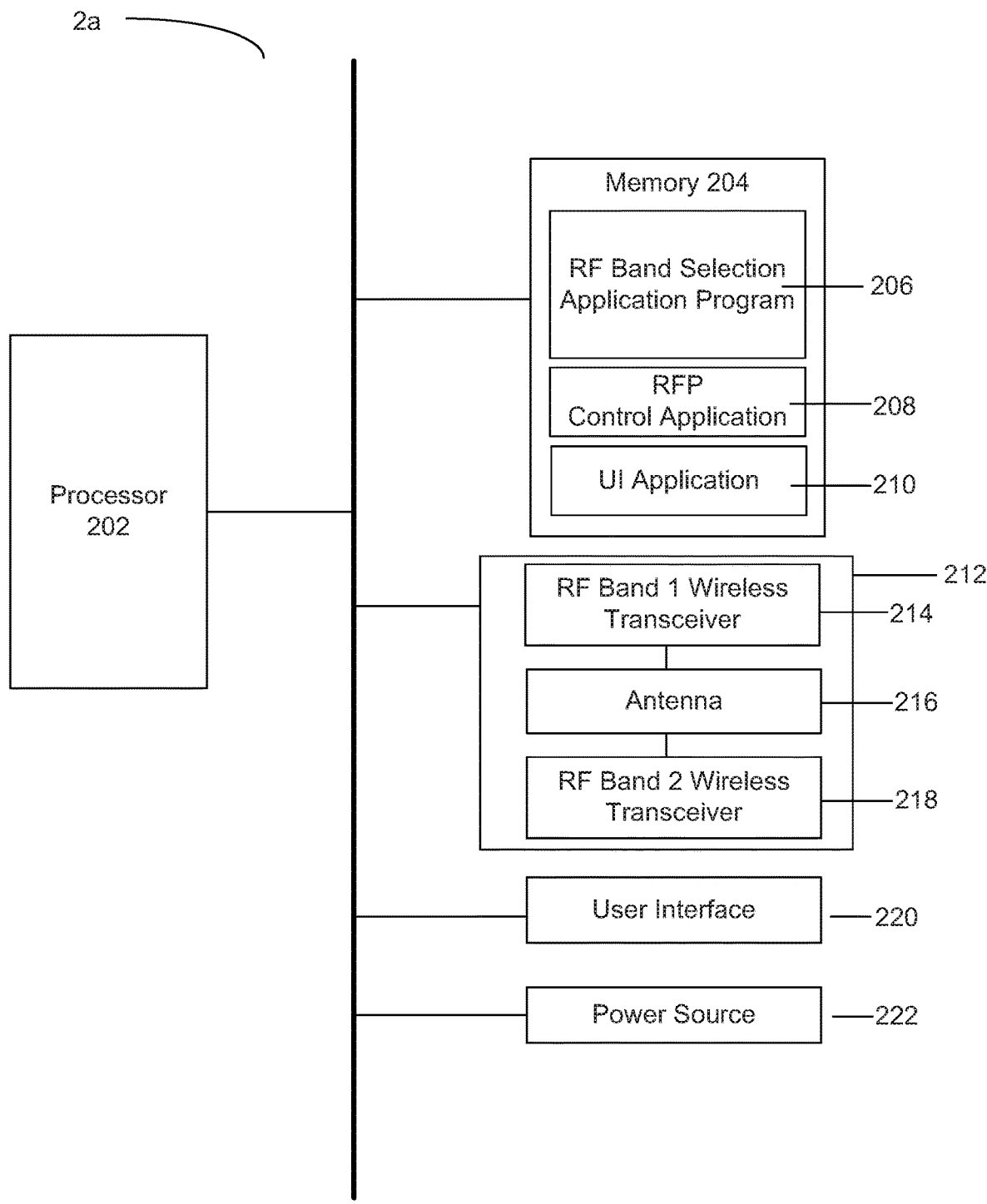
FIG. 2 illustrates a block diagram of a radio fixed part with a RF band selection application.

FIG. 2 illustrates a block diagram of a radio fixed part 2a with multiple RF band operation. Radio fixed parts 2b, 2c, 2d . . . 2xx have the same or similar structure. Radio fixed part 2a includes a processor 202 operably coupled to a memory 204, a dual band radio 212, a user interface 220, and a power source 222. A speaker and a microphone may also be included. Dual band radio 212 includes circuitry for a RF band 1 wireless transceiver 214 and a RF band 2 wireless transceiver 218. In the example shown in FIG. 2, an antenna 216 is shared by RF band 1 wireless transceiver 214 and RF band 2 wireless transceiver 218. In further examples, each RF band transceiver may utilize an independent antenna. In one example, the RF band 1 wireless transceiver 214 allows for operation performing services requiring a higher quality of service (QoS), such as voice communications, relative to the RF band 2 wireless transceiver 218, whereas the RF band 2 wireless transceiver 218 allows for operation performing services requiring best-effort services, such as non-voice data transfer. In one example, RF band 1 wireless transceiver 214 is a DECT transceiver operating in a DECT dedicated band and RF band 2 wireless transceiver 218 is a DECT transceiver operating in a non-dedicated ISM band. In further examples, the radio fixed part 2a may be a tri-band radio or quad-band radio having circuitry for operating in multiple DECT dedicated bands and/or multiple non-dedicated ISM bands.

In one advantageous implementation, the DECT dedicated band is between 1920-1930 MHz (i.e., the "1.9 GHz band") and the non-dedicated ISM band is between 902-928 MHz (i.e., the "900 MHz band"). In further examples, the DECT dedicated band may be between 1880-1900 MHz. In a further example, the non-dedicated ISM band may be selected from one or more of the 900 MHz band, the 2400-2483.5 MHz band (i.e., the 2.4 GHz band) and/or the 5725-5875 MHz band (i.e., the 5.8 GHz band). In further examples, the RF band 1 wireless transceiver 214 and RF band 2 wireless transceiver 218 may vary based on the desired operating characteristics and usage of radio fixed part 2a.

In a further example, an alternative system to DECT is employed. For example, a system that uses both licensed and unlicensed bands may be used. For example, the DECT dedicated band is replaced with the licensed band of cellular LTE or 5G systems and the non-dedicated ISM band is replaced with the unlicensed spectrum of cellular LTE or 5G systems. In LTE and 5G, the use of unlicensed spectrum for cellular applications is allowed for (i.e., LTE-U and LAA-LTE, where U stands for unlicensed and LAA for License Assisted Access). In yet another example, a system that can operate in multiple bands may be used. For example, IEEE 802.11 ("WiFi") can operate both in 2.4 GHz and in 5.8 GHz, where more interference is experienced at 2.4 GHz than in 5.8 GHz. In this exam ple, services requiring QoS services are placed in the 5.8 GHz band and services requiring only best-effort services are placed in the 2.4 GHz band.

Processor 202 allows for processing data, in particular managing service negotiations data (e.g., connection request data) between dual band radio 212 and memory 204 for determining whether to operate radio fixed part 2a using RF band 1 wireless transceiver 214 or RF band 2wireless transceiver 218. In one example, processor 202 is a high performance, highly integrated, and highly flexible system-on-chip (SOC) having signal processing functionality. Processor 202 may include a variety of processors (e.g., digital signal processors), with conventional CPUs being applicable.

Memory 204 may include a variety of memories, and in one example includes SDRAM, ROM, flash memory, or a combination thereof. Memory 204 may further include separate memory structures or a single integrated memory structure. In one example, memory 204 may be used to store passwords, network and telecommunications programs, and/or an operating system (OS). Memory 204 includes a radio fixed part control application 208 and a user interface application 210. User interface 220 allows for communication between the radio fixed part user and the radio fixed part 2a, and in one example includes an audio and/or visual interface.

Memory 204 stores a RF band selection application program 206 executed by processor 202 to determine the operating RF band of the radio fixed part 2a. RF band selection application program 206 is operable to receive and process connection requests from a portable part (e.g., portable part 4a). Memory 204 may store data for use by RF band selection application program 206 to determine the operating band of radio fixed part 2a. For example, such data may include pre-determined criteria for which services are designed as requiring quality of service (QoS) and which services are designated best-effort services. The RF band selection application program 206 may implement a variety of methods to process service negotiations data and select the desired RF band.

DECT has traditionally focused on voice service, bringing digital cordless telephony into the home and office/enterprise environment. In 2013, the DECT standard was extended with services for Home Automation and Internet-of-Things (TS 102 939-01), called DECT Ultra Low Energy (ULE). The basic ULE wireless network uses a star network topology. There is one main device, called a "base", which controls the network. As used herein, the term radio fixed part encompasses these base devices. The base is wirelessly connected to "nodes", which usually are devices with dedicated functions, such as sensors, remote controls, actuators, and smart meters. Examples of node devices include door locks, smoke detectors, motion detectors, remote controls, gas and electricity meters, baby monitors, and elderly care monitors. As used herein, the term "portable part" encompasses these node devices.

In general, two types of services can be distinguished: (a) services requiring Quality-of-Service (QoS), and (b) best-effort services. QoS normally have strict delay constraints. An example is voice service. For an acceptable voice experience, the end-to-end round-trip delay over the bi-directional link should not exceed more than say 250 ms. Other delay sensitive services we find in certain security and monitoring services, although typically longer latencies can be tolerated, up to several seconds (except for certain industrial process monitoring use cases maybe). The QoS services are typically controlled by classic DECT's Generic Access Profile (GAP) and NG (New Generation) profiles and preferably use the dedicated (least interfered) band.

In contrast, best effort services have much less latency constraints. Sending a control message or some surveillance data normally is not that delay sensitive. Services envisioned for ULE are typically best effort services and can be provided in an RF band where more interference can be expected. To get the message over successfully, retransmissions such as automatic repeat request (ARQ) schemes may be necessary which may introduce tolerable delay.

Certain nodes may include both QoS and best-effort services at the same time. For example, a DECT phone may use a QoS link for voice communication on a first channel A, and use a low-duty cycle best-effort link for communicating side information on a second channel B. The side information may include sensor data related to the user's environment or related to the user's well-being, and/or may include data insight information related to the voice call. Channel A may use a dedicated RF band to maintain the QoS required whereas channel B may use a best-effort RF band. That means that for certain time slots it uses the first RF band whereas for other time slots it uses the second RF band.

In one example operation, radio fixed part 2a is operated in an RF band 1. This may include, for example, transmitting during an idle mode a beacon on at least one channel in the RF band 1. For example, the RF band 1 is a DECT dedicated band having a first DECT frequency band between 1880-1900 Mhz or a second DECT frequency band between 1920-1930 MHz.

In one example operation during idle mode, the radio fixed part 2a monitors interference from other users in RF band 1 to determine the best channel and timeslot to broadcast a beacon on. The beacon is moved periodically to another channel and timeslot so all radio fixed parts do not broadcast on the same channel and timeslot. When the portable part 4a is in idle mode, it scans for beacon signals of a nearby radio fixed part 2a. The portable part 4a scans the channels until it locates the transmissions of the radio fixed part 2a and locks on to this channel. The portable part 4a monitors own-transmissions link RSSI and other-user RSSI in order to select the best channel for communication and to handover to another channel and/or timeslot if it encounters interference. In one example, a connection request, such as an outgoing call request is transmitted by the portable part 4a on a single channel which has been selected on the criteria of minimum interference utilizing dynamic channel selection (DCS). The connection request includes a field identifying the number of physical channels the portable part 4a will require. A physical channel is a combination of any of the DECT time slots and any of the DECT carrier frequencies. Since the portable part 4a is exposed to more varying signals due to fade environments and moving into range of other systems it may be better suited to do the channel selection.

The radio fixed part 2a and portable part 4a are synchronized to each other so that the portable part 4a always knows what channel, timeslot and RF band the radio fixed part 2a will be receiving on so a link for communication can be rapidly established. The radio fixed part 2a sends a quality message to the portable part 4a to pick another channel and/or timeslot if it is encountering interference in receiving the signal from the portable part 4a. With this system the portable part 4a has the information it needs to make the channel and/or timeslot selection.

A connection request may be received at the radio fixed part 2a from the portable part 4a utilizing the RF band 1. The connection request is processed to designate whether the connection request is a priority services request type (e.g., a service type requiring QoS) or a non-priority services request type (e.g., a service type requiring only best-effort services). For example, processing the connection request to designate whether the connection request is a priority services request type or a non-priority services request type includes determining whether the connection request comprises a request for voice communication services. Where the connection request is a request for voice communication services (e.g., voice telephony communication services), the connection request is designated a priority services request type. Where the connection request is for non-telephony data services (e.g., sensor data transfer services), the connection request is designated a non-priority services request type.

In DECT, messages at the network layer NWK (EN 300 175-5) and higher layers determine the type of service requested. The request can come from the radio fixed part 2a or the portable part 4a. Service negotiation may be supported during the call establishment phase. This possibility shall be indicated in the first call setup message. The negotiation shall involve further peer-to-peer exchanges to determine an agreed set of service attributes. During the connection, the services can also be renegotiated using change request messages.

In one example implementation, high-rate services requiring high data rates are designated a priority services request type (i.e., services requiring QoS). At the PHY layer, DECT supports different modulation schemes that lead to different peak data rates. However, modulation schemes using higher modulation schemes can tolerate less interference. Originally, DECT used a binary Gaussian Minimum Shift Keying (GMSK) scheme. In more recent releases, QAM (Quadrature Amplitude Modulation) has been standardized. QAM schemes use more bits per symbol. As a result, a higher Carrier-to-Interference ratio is required for acceptable error rates. Services with a higher data rate result in shorter packets, introducing less traffic load in the RF spectrum. This will benefit other users sharing the same band and is typically used to increase the user density in a specific area. However, since higher rate modulation can tolerate less interference, preferably these high-rate services utilize the dedicated, QoS band.

Responsive to designating the connection request as the non-priority services request type, radio fixed part 2a establishes a non-priority services communications channel between the radio fixed part 2a and the portable part 4a utilizing an RF band 2. In a further example, portable part 4a establishes the non-priority services communications channel. For example, the RF band 2 is a non-dedicated ISM band. The non-dedicated ISM band may, for example, include an ISM band between 902-908 MHz.

Responsive to designating the connection request as a priority services request type, radio fixed part 2a determines whether a priority services channel is available or not available in the RF band 1. To determine whether a priority services channel is available or not available, radio fixed part 2a may monitor a channel quality for each channel in the RF band 1. If a priority services channel is available, radio fixed part 2a establishes a priority services communications channel between the radio fixed part 2a and the portable part 4a utilizing the RF band 1. Communications are then performed utilizing RF band 1.

If a priority services channel is not available, an interim non-priority services communications channel is established between the radio fixed part 2a and the portable part 4a utilizing the RF band 2. Communications are then performed between the radio fixed part 2a and the portable part 4a utilizing the interim non-priority services communications channel. Radio fixed part 2a monitors an availability of a newly available priority services channel having a sufficient desired quality in the RF band 1 while utilizing the interim non-priority services communications channel. For example, radio fixed part 2a scans and records the quality of each channel in RF band 1. If radio fixed part 2a identifies the availability of the newly available priority services channel in the RF band 1, it performs a handover of communications between the radio fixed part 2a and the portable part 4a from the interim non-priority services communications channel to the newly available priority services communications channel. In a further example, portable part 4a establishes the priority services communications channel and performs the handover functions.

Figure 3:
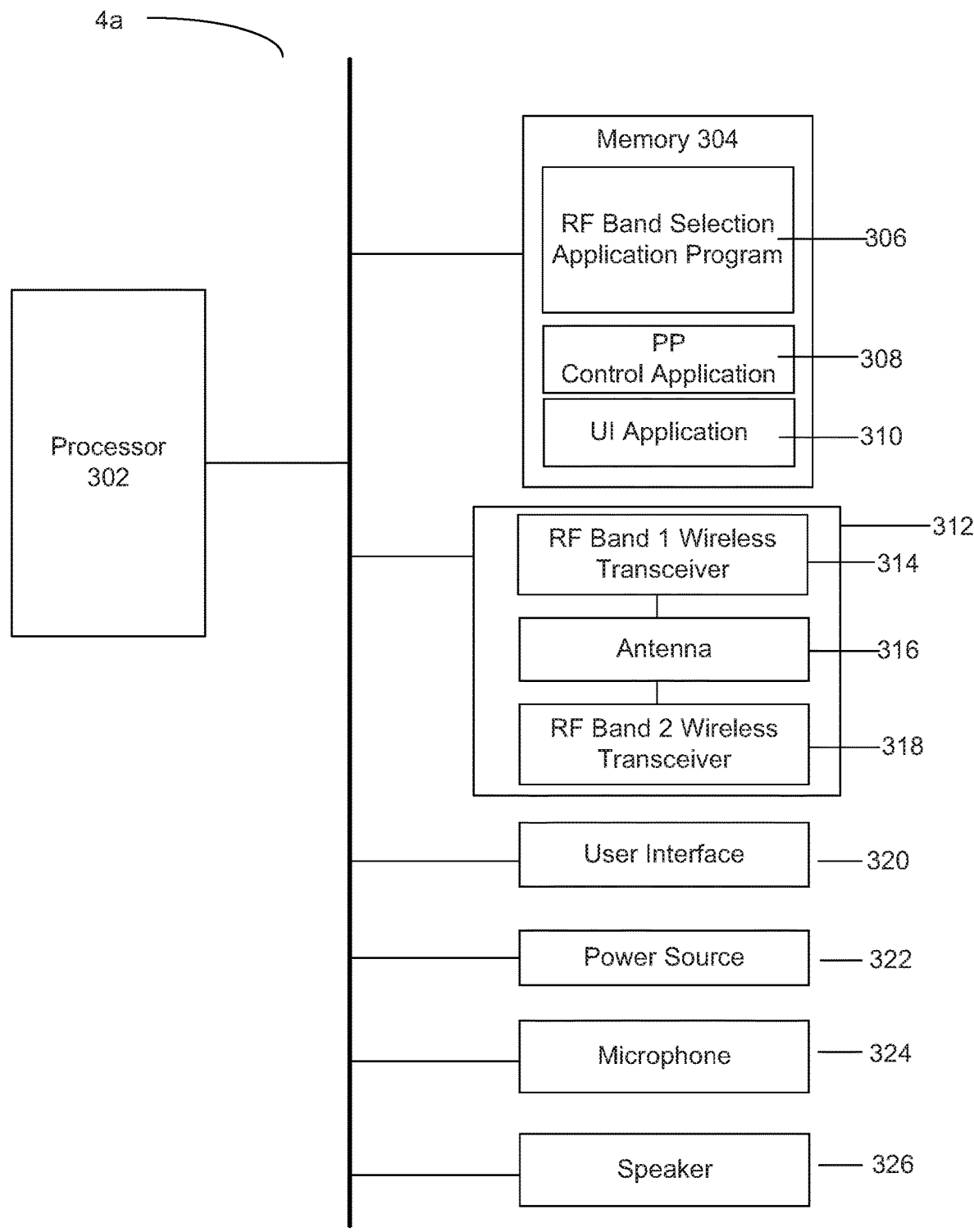
FIG. 3 illustrates a block diagram of a portable part with a RF band selection application.

FIG. 3 illustrates a block diagram of a portable part with multiple RF band operation. Portable parts 4b, 4c, 4d . . . 4xx have the same or similar structure. Portable part 4a includes a processor 302 operably coupled to a memory 304, a dual band radio 312, a user interface 320, a power source 322, a microphone 324, and a speaker 326. Dual band radio 312 includes circuitry for a RF band 1 wireless transceiver 314 and a RF band 2 wireless transceiver 318. In the example shown in FIG. 3, an antenna 316 is shared by RF band 1 wireless transceiver 314 and RF band 2 wireless transceiver 318. In further examples, each RF band transceiver may utilize an independent antenna. In one example, the RF band 1 wireless transceiver 314 allows for operation performing services requiring a higher quality of service (QoS), such as voice communications, relative to the RF band 2 wireless transceiver 318, whereas the RF band 2 wireless transceiver 318 allows for operation performing services requiring best-effort services, such as non-voice data transfer. In one example, RF band 1 wireless transceiver 314 is a DECT transceiver operating in a DECT dedicated band and RF band 2 wireless transceiver 318 is a DECT transceiver operating in a non-dedicated ISM band. In further examples, the portable part 2b may be a tri-band radio or quad-band radio having circuitry for operating in multiple DECT dedicated bands and/or multiple non-dedicated ISM bands.

In one advantageous implementation, the DECT dedicated band is the 1.9 GHz band and the non-dedicated ISM band is the 900 MHz band. In a further example, the DECT dedicated band is between 1880-1900 MHz. In a further example, the non-dedicated ISM band is selected from one or more of the 900 MHz band, the 2.4 GHz band, and the 5.8 GHz band. In further examples, the RF band 1 wireless transceiver 314 and RF band 2 wireless transceiver 318 may vary based on the desired operating characteristics and usage of portable part 4a.

Processor 302 allows for processing data, in particular managing service negotiations data (e.g., connection request data) between dual band radio 312 and memory 304 for determining whether to operate portable part 4a using RF band 1 wireless transceiver 314 or RF band 2 wireless transceiver 318. In one example, processor 302 is a high performance, highly integrated, and highly flexible system-on-chip (SOC) having signal processing functionality. Processor 302 may include a variety of processors (e.g., digital signal processors), with conventional CPUs being applicable.

Memory 304 may include a variety of memories, and in one example includes SDRAM, ROM, flash memory, or a combination thereof. Memory 304 may further include separate memory structures or a single integrated memory structure. In one example, memory 304 may be used to store passwords, network and telecommunications programs, and/or an operating system (OS). Memory 304 includes a portable part control application 308 and a user interface application 310. User interface 320 allows for manual communication between the portable part user and the portable part, and in one example includes an audio and/or visual interface such that an audio prompt may be output and/or an LED may be lit.

Memory 304 stores a RF band selection application program 306 executed by processor 302 to determine the operating RF band of the portable part 4a. RF band selection application program 306 is operable to receive and process connection requests from a radio fixed part (e.g., radio fixed part 2a). Memory 304 may store data for use by RF band selection application program 306 to determine the operating band of portable part 4a. For example, such data may include pre-determined criteria for which services are designed as requiring quality of service and which services are designated best-effort services. The RF band selection application program 306 may implement a variety of methods to process service negotiations data and select the desired RF band.

In one example operation, portable part 4a is operated in an RF band 1. Portable part 44a sends a connection request to radio fixed part 2a utilizing the RF band 1, the connection request comprising a priority services request type or a non-priority services request type.

Radio fixed part 2a establishes a non-priority services communications channel between the portable part 4a and the radio fixed part 2a utilizing an RF band 2 if the connection request is the non-priority services request type. In a further example, portable part 4a establishes the non-priority services communications channel.

If the connection request is a priority services request type, radio fixed part 2a either (a) establishes a priority services communications channel between the portable part 4a and the radio fixed part 2a utilizing the RF band 1 following a determination the priority services channel is available in the RF band 1, or (b) establishes an interim non-priority services communications channel between the radio fixed part 2a and the portable part 4a utilizing the second radio frequency band following a determination the priority services channel is not available in the RF band 1. In a further example, portable part 4a establishes the priority services communications channel or the interim non-priority services communications channel.

Figure 4:
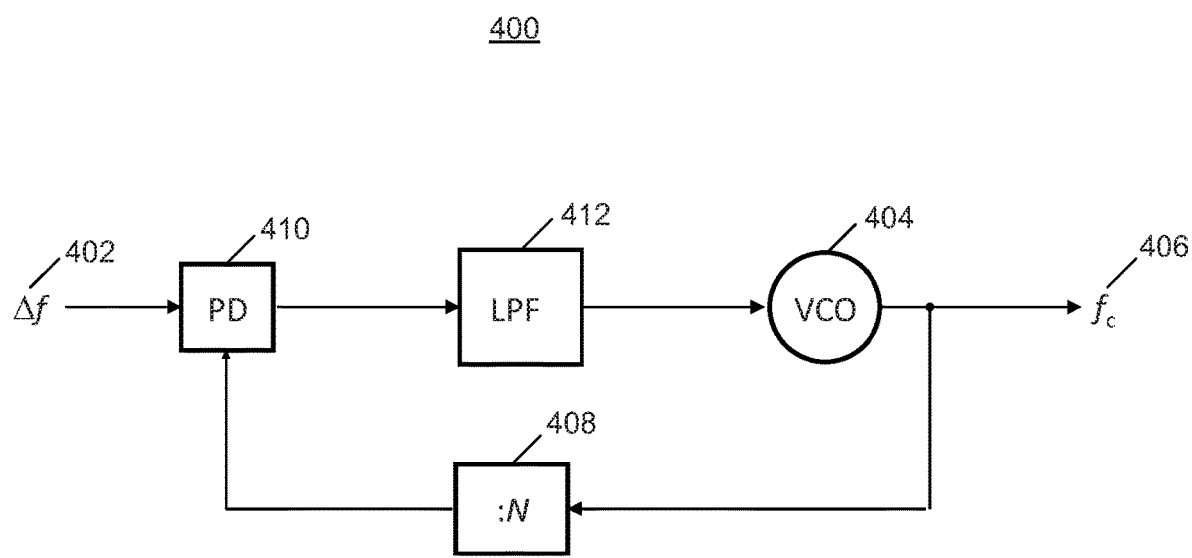
FIG. 4 illustrates a phase lock loop in one example implementation.
Figure 5:
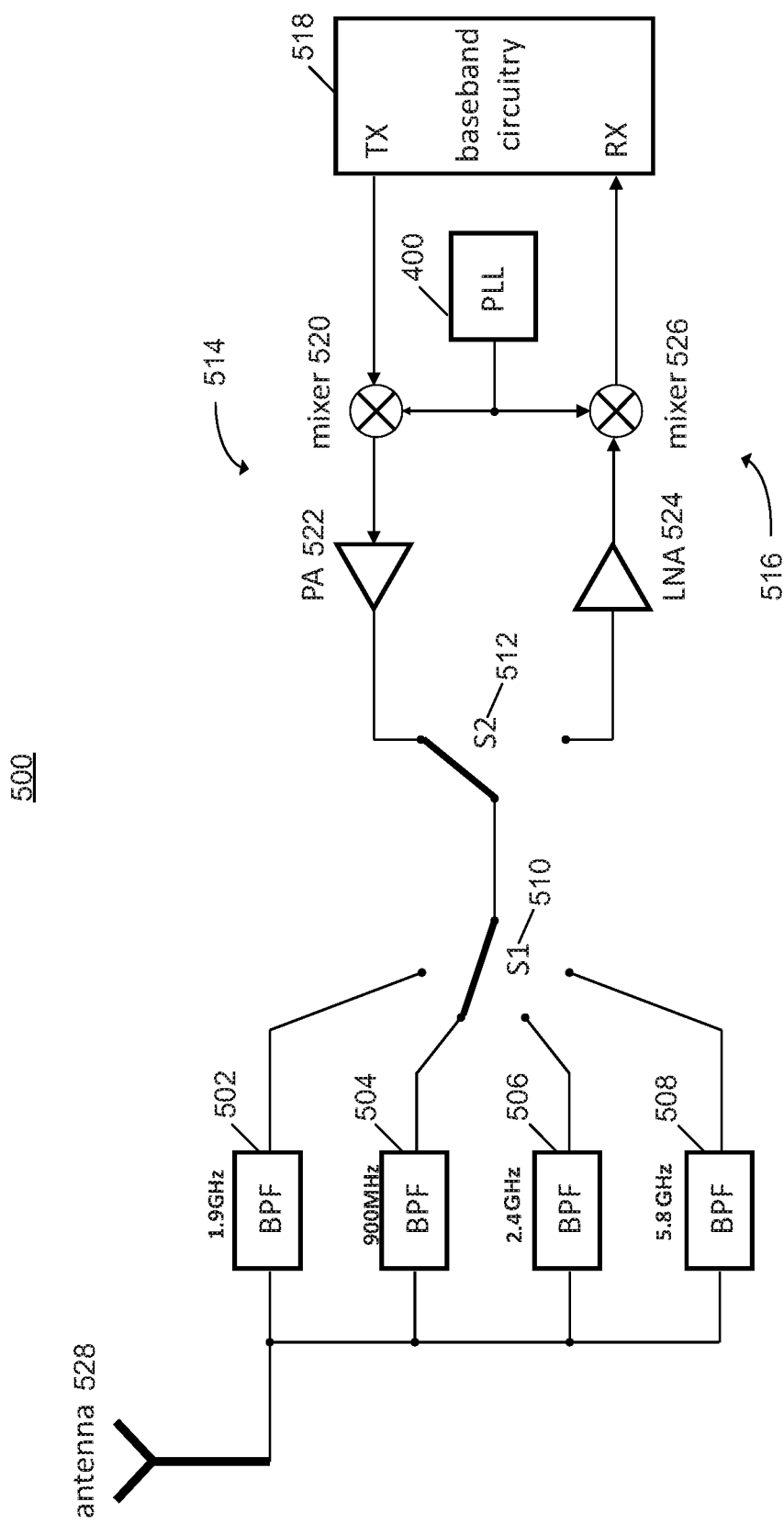
FIG. 5 illustrates a simplified multiple RF band circuit in one example.

In one example embodiment, illustrated in FIG. 4 and FIG. 5, instead of selection of a single RF band 2 when selecting a non-dedicated ISM band, radio fixed part 2a and/or portable part 4a may select from two or more non-dedicated ISM bands. As discussed previously, RF band 1 is a DECT dedicated band: 1880-1900 MHz or 1920-1930 MHz (the 1.9 GHz band). In FIG. 4 and FIG. 5, selectable non-dedicated ISM bands include: 902-928 MHz (900 MHz, band), 2400-2483.5 MHz (2.4 GHz band), and 5725-5875 MHz (5.8 GHz). DECT uses a carrier spacing of $\Delta f = 1.728$ MHz. The carriers used in each of the bands listed above can be created by an integer multiple of $\Delta f$:

| 1880-1900 MHz: | | |
|---|---|---|
| 10 channels with carriers:<br>Used in Europe, Asia, Australia | $f_c = (1089 + k) \cdot \Delta f$, | $k = 0, 1, \ldots 9$ |
| 1920-1930 MHz: | | |
| 5 channels with carriers:<br>Used in the USA | $f_c = (1112 + k) \cdot \Delta f$, | $k = 0, 1, \ldots 4$ |
| 902-928 MHz: | | |
| 14 channels with carriers:<br>Used in the USA | $f_c = (523 + k) \cdot \Delta f$, | $k = 0, 1, \ldots 13$ |
| 2400-2483.5 MHz: | | |
| 45 channels with carriers:<br>Used world wide | $f_c = (1391 + k) \cdot \Delta f$, | $k = 0, 1, \ldots 44$ |
| 5725-5875 MHz: | | |
| 70 channels with carriers:<br>Used world wide | $f_c = (3314 + k) \cdot \Delta f$, | $k = 0, 1, \ldots 69$ |

Each of these carriers is created with a single phase lock loop (PLL) which has 1.728 MHz as the reference input signal. A single, broadband VCO (Voltage Controlled Oscillator) is used. If the VCO does not have the frequency range (i.e., from 900 MHz up to 5875 MHz), multiple VCOs are utilized. FIG. 4 illustrates a PLL 400 in one example implementation.

Referring to FIG. 4, the voltage controlled oscillator (VCO) 404 output is the RF carrier $f_c$ 406. It is divided down by the prescaler (division factor N) 408 and then compared in the phase detector (PD) 410 with the input signal $\Delta f$ 402 (i.e., the 1.728 MHz reference). The PD 410 output is filtered with low pass filter (LPF) 412 and fed to the VCO 404 control input. The VCO 404 output is $f_c = N \times \Delta f$.

Figure 6:
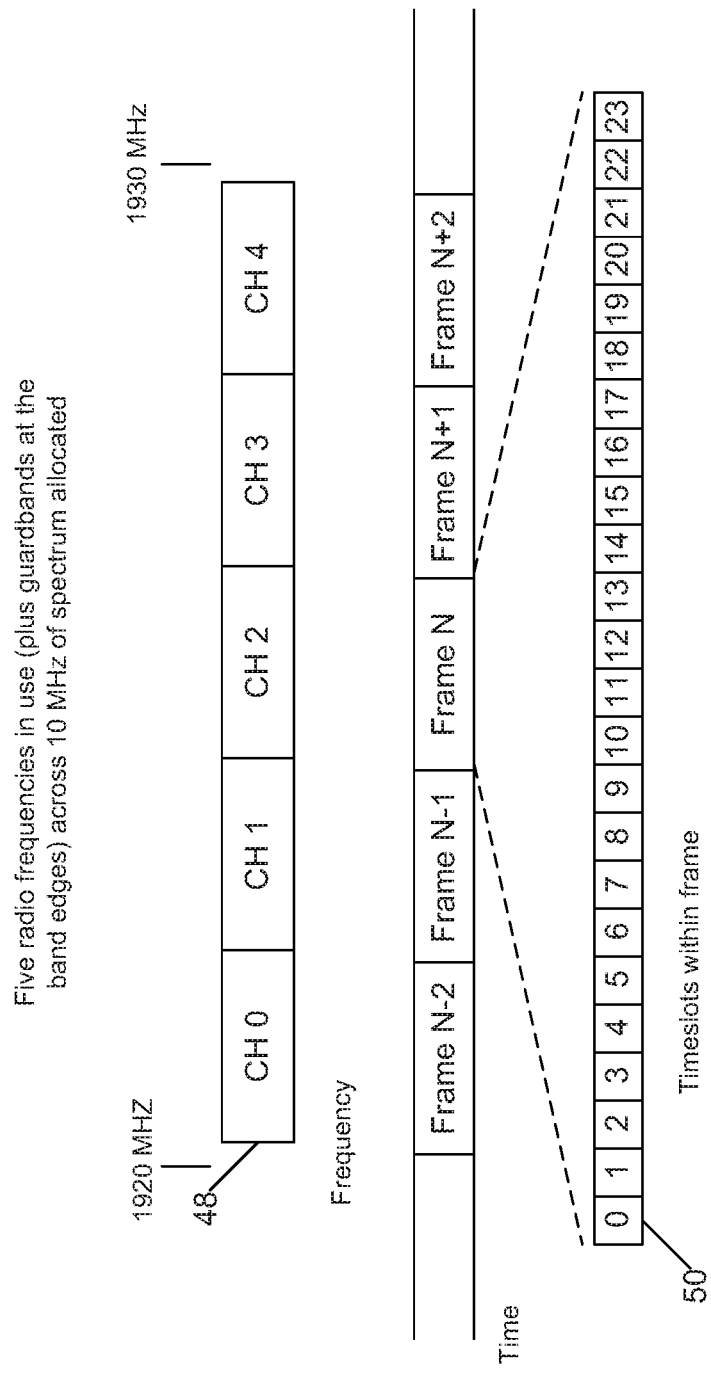
FIG. 6 illustrates a DECT channel and frame structure in one example.

For the DECT transceiver, the baseband circuitry is reused to create the basic physical (PHY) layer in each band. FIG. 6 illustrates a DECT channel and frame structure in one example. In the example illustrated in FIG. 6, a United States DECT 6.0 system is illustrated. There are five channels 48 having 1,728 kHz spacing available for use by the system, channels CH0, CH1, CH2, CH3, and CH4. The frequency band of operation is 1920 MHz-1930 MHz. One of ordinary skill in the art will recognize that where other DECT systems are utilized, such as those in Europe, these figures will vary. For example, in Europe, ten carriers are utilized in the frequency band 1880 MHz-1900 MHz. There are twenty four timeslots 50 per frame, including twelve time slots in a down-link direction (i.e., radio fixed part 2a to portable part 4a) followed by twelve slots for the up-link direction (i.e., portable part 4a to radio fixed part 2a). A timeslot 50 is 416.7 microseconds long, or 480 bit periods where the instantaneous data rate is 1.152 Mbits/sec.

The RF circuit is adapted to place the PHY layer in the proper RF band. FIG. 5 illustrates a simplified multiple RF band circuit 500 in one example. The multiple RF band circuit 500 electronics are controlled by software that runs on a baseband microcontroller. The multiple RF band circuit 500 allows for fast switching between a dedicated DECT band and the non-dedicated ISM bands so that either type of band can be utilized for wireless communication by the radio fixed part 2a and portable part 4a. The ability to operate on different timeslots in the same frame that use either the dedicated DECT band or the non-dedicated ISM band allows for increased user density and audio bandwidth in wireless devices.

The implementation example in FIG. 5 covers four bands: 1.9 GHz, 900 MHz, 2.4 GHz, and 5.8 GHz. For each band (1.9 GHz, 900 MHz, 2.4 GHz, and 5.8 GHz), a bandpass filter (BPF) (502, 504, 506, and 508, respectively) is utilized to suppress the out-of-band jammers and interferers. For example, the bandpass filters 502, 504, 506, and 508 are surface acoustic wave (SAW) or ceramic filters. Switch S1 510 selects the proper bandpass filter. Switch S2 512 selects between Transmit (e.g., switch up) or Receive (e.g., switch down) mode. DECT applies Time Division Duplexing (TDD) whereby the transceiver either transmits or receives. The transmission path 514 operates as follows. The baseband signal created in the baseband circuitry 518 (output TX) is up-converted by a mixer 520 to the proper RF carrier frequency $f_c$. For this, the baseband signal is multiplied with the desired carrier frequency created by the PLL 400 as shown in FIG. 4. The output of mixer 520 is then fed to a Power Amplifier (PA) 522 to amplify the signal to a proper level to be transmitted. Then via switch S2 512 and S1 510, the transmit signal goes through the proper bandpass filter and is sent by the antenna 528.

The receive path 516 operates as follows. After the RF signal is picked up by the antenna 528 and filtered by a bandpass filter, it reaches the Low Noise Amplifier (LNA) 524 via switch S2 512. The RF signal is amplified to a proper level. Then the RF signal is down-converted to an Intermediate Frequency (IF) or baseband signal using the mixer 526. Finally, the signal enters the baseband circuitry 518 at input RX. FIG. 5 illustrates an advantageous compact implementation with a minimal number of components. It utilizes wideband components that can cover the entire desired frequency range (e.g., from 902 MHz at the lower end to 5875 MHz at the upper end). In other implementations that cannot cover the entire range, additional components may be added with each tuned as needed. Switches may be added to route the signals to the proper components depending on the frequency band selected.

Figure 7A:
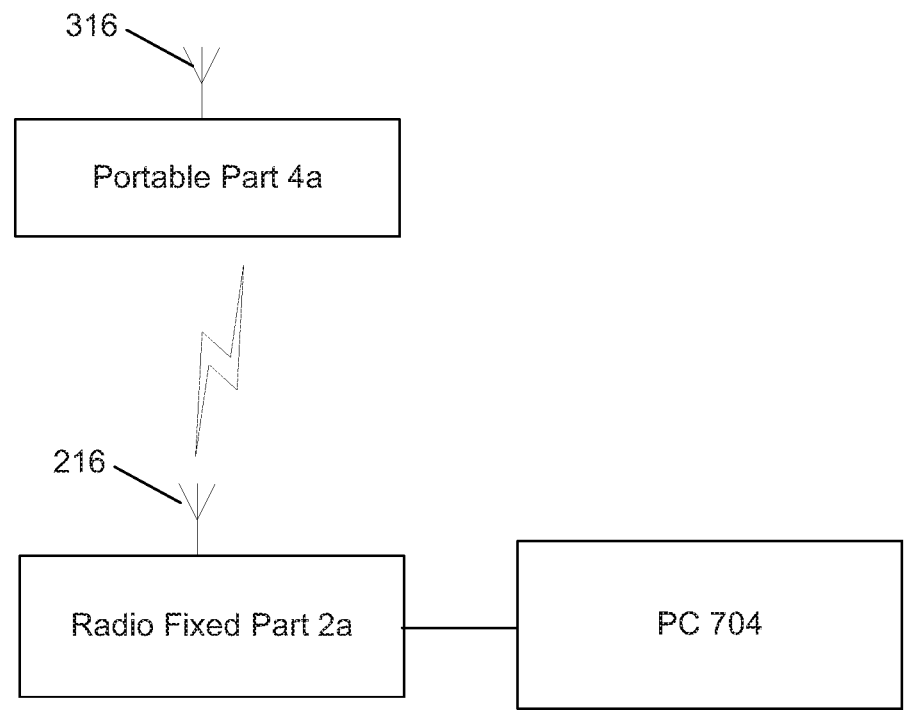
FIG. 7A illustrates a system for multiple RF band operation of the portable part 4a shown in FIG. 1 in one example implementation.
Figure 7B:
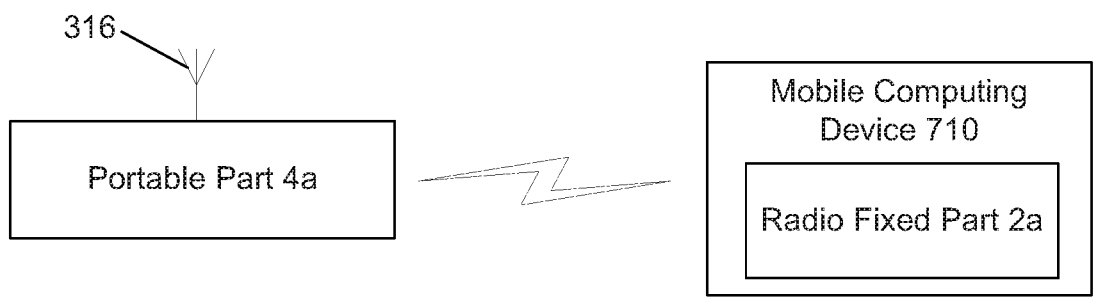
FIG. 7B illustrates a system for multiple RF band operation of the mobile communication device shown in FIG. 1 in a further example implementation.

FIG. 7A illustrates a system for multiple RF band operation of the portable part 4a shown in FIG. 1 in one example implementation. Referring to FIG. 7A, radio fixed part 2a (e.g., a base station) is coupled to a computer 704 (e.g., a personal computer or any type of computing device). In one example, radio fixed part 2a is coupled to computer 704 using a USB interface. FIG. 7B illustrates a system for multiple RF band operation of the mobile communication device shown in FIG. 1 in a further example implementation. Referring to FIG. 7B, radio fixed part 2a shown in FIG. 1 is integrated with a mobile computing device 710. For example, mobile computing device 710 may be a handset, mobile cell phone, smartphone, or laptop computer.

In various embodiments, the techniques of FIGS. 8, 9A-9B, and 10 discussed below may be implemented as sequences of instructions executed by one or more electronic systems. The instructions may be stored by the radio fixed part 2a or the instructions may be received by the radio fixed part 2a (e.g., via a network connection), the instructions may be stored by the portable part 4a or the instructions may be received by portable part 4a, or some combination thereof.

Figure 8:
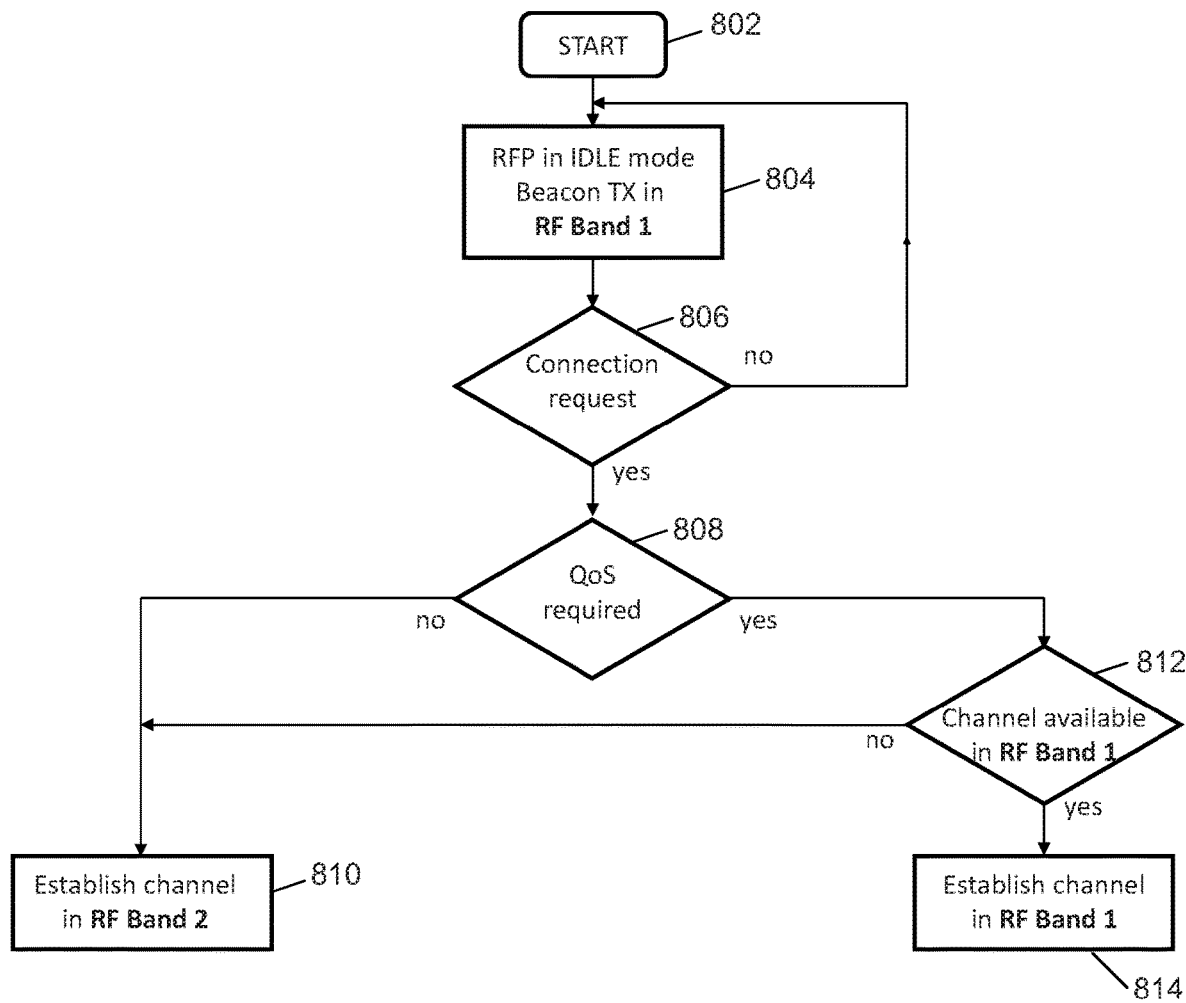
FIG. 8 is a flow diagram illustrating a process for operating in a first RF band 1 or a second RF band 2 based on service request type in one example.

FIG. 8 is a flow diagram illustrating a process for operating in a first RF band 1 or a second RF band 2 based on service request type in one example. At block 802, the process starts in an idle mode. For example, RF band 1 is the protected, license-exempt band at 1.9 GHz and RF band 2 is the license-free band at 900 MHz. At block 804, during IDLE mode, the radio fixed part regularly broadcasts a beacon signal to lock the portable part in RF band 1.

At decision block 806, it is determined whether a connection request has been received. If no at decision block 806, the process returns to block 804. If yes at decision block 806, the process proceeds to decision block 808. At decision block 808, it is determined what kind of service is requested (i.e., whether QoS is required). If QoS is not required, at block 810 a traffic channel in RF band 2 is established. If QoS is required, at decision block 812 it is determined if a traffic channel in RF band 1 is available. For example, a channel of sufficient quality is searched for.

If yes at decision block 812, a channel in RF band 1 is established at block 814. If no at decision block 812 (e.g., a channel with sufficient quality cannot be found), the process proceeds to block 810 where a traffic channel in RF band 2 is established. While in connection mode, the system may than regularly check RF band 1 for availability and do a handover to a traffic channel in RF band 1 if a channel with sufficient quality can be found. In an example where RF band 1 is the protected, license-exempt band at 1.9 GHz and RF band 2 is the license-free band at 900 MHz, the combined number of orthogonal two-way channels is 228.

Figure 9A:
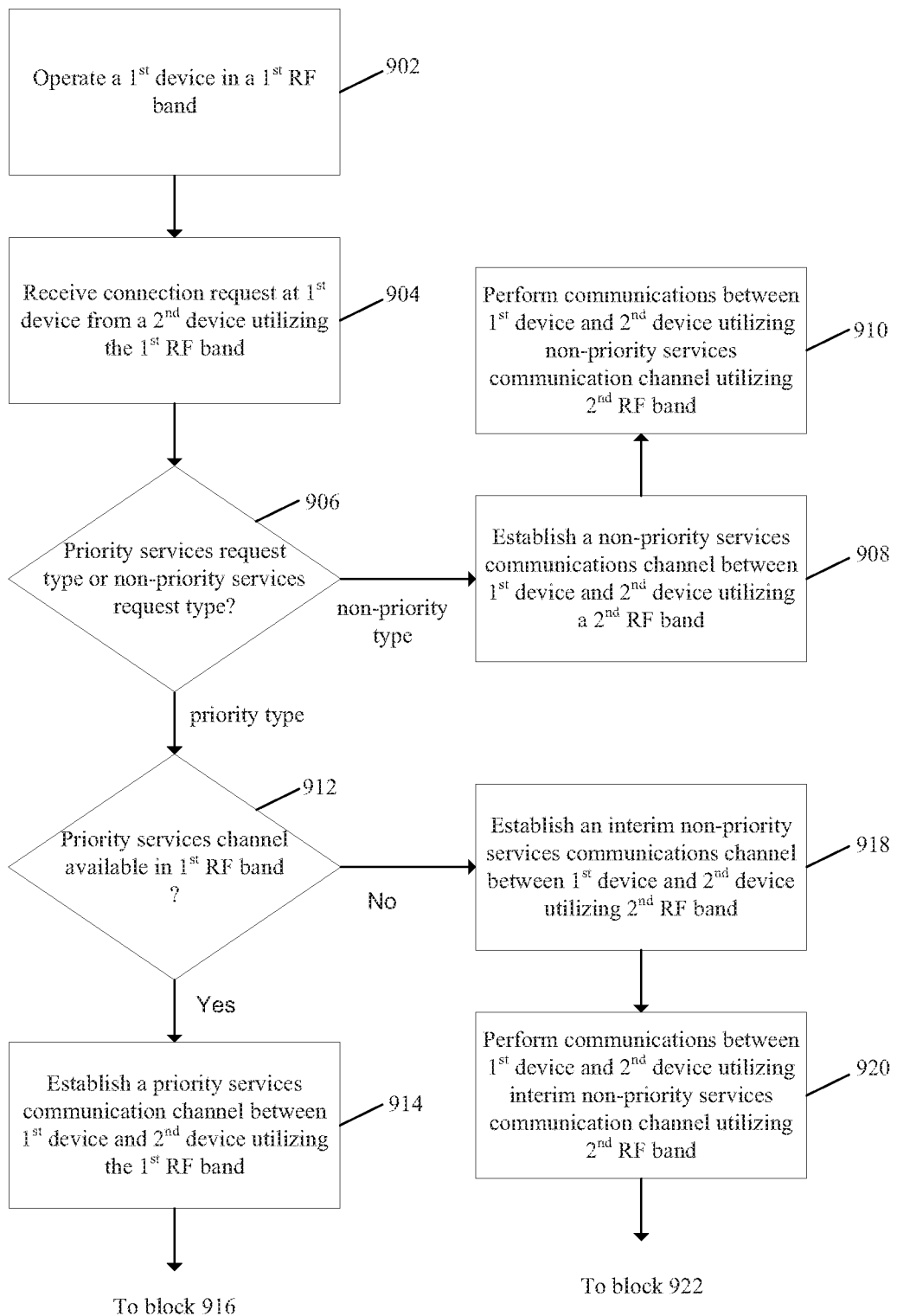
FIGS. 9A and 9B are a flow diagram illustrating a process for multiple radio frequency band operation based on service request type in one example.
Figure 9B:
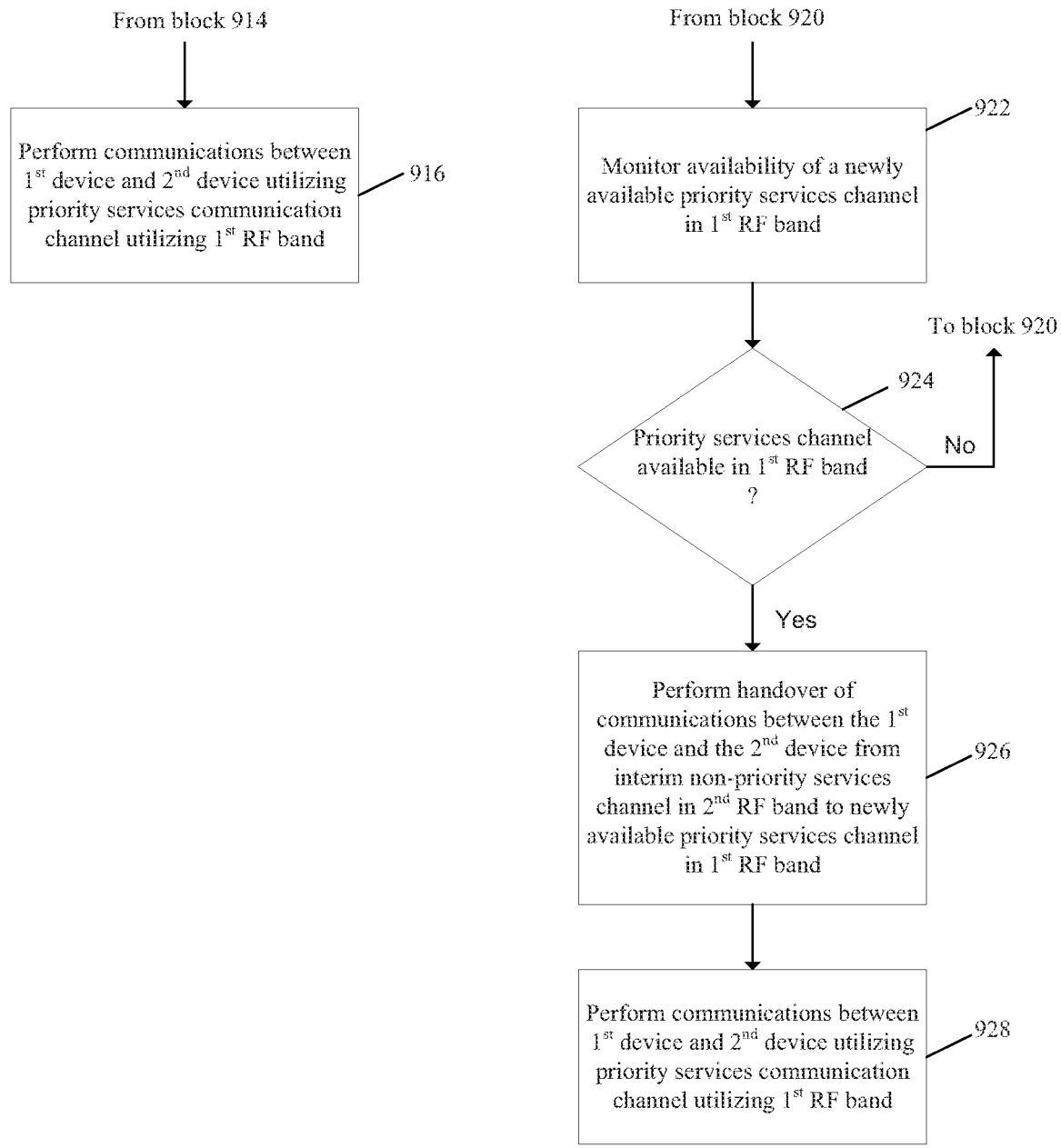

FIGS. 9A and 9B are a flow diagram illustrating a process for multiple radio frequency band operation based on service request type in one example. At block 902, a first device is operated in a first radio frequency band. In one example, operating the first device in the first radio frequency band includes transmitting during an idle mode a beacon on at least one channel in the first radio frequency band.

At block 904, a connection request is received at the first device from a second device utilizing the first radio frequency band. In one example, the first device includes a radio fixed part device and the second device includes a portable part device. In a further example, the first device includes a portable part device and the second device includes a radio fixed part device.

At decision block 906, it is determined whether the connection request is a priority services request type or a non-priority services request type. For example, the connection request is processed to designate whether the connection request is a priority services request type or a non-priority services request type. In one example, processing the connection request to designate whether the connection request is a priority services request type or a non-priority services request type includes determining whether the connection request includes a request for voice communication services. In one example, a request for voice telephony communication services is designated a priority services request type and a request for non-telephony data services is designated a non-priority services request type. For example, the non-telephony data services include sensor data transfer services.

If the connection request is a non-priority services request type, at block 908 a non-priority services communications channel between the first device and the second device is established utilizing a second radio frequency band. Following block 908, at block 910 communications between the first device and the second device are performed utilizing the non-priority services communications channel utilizing the second radio frequency band.

In one example, the first radio frequency band is a DECT dedicated band and the second radio frequency band is a non-dedicated ISM band. For example, the DECT dedicated band is a first DECT frequency band between 1880-1900 MHz or a second DECT frequency band between 1920-1930 MHz, and the non-dedicated ISM band is an ISM band between 902-908 MHz.

If the connection request is a priority services request type, at decision block 912 it is determined whether a priority services channel is available in the first radio frequency band. In one example, determining whether the priority services channel is available in the first radio frequency band includes monitoring a channel quality for each channel in the first radio frequency band.

If yes at decision block 912, a priority services communications channel between the first device and the second device is established utilizing the first radio frequency band at block 914. Following block 914, at block 916 communications between the first device and the second device are performed utilizing the priority services communications channel utilizing the first radio frequency band.

If no at decision block 912, an interim non-priority services communications channel between the first device and the second device is established utilizing the second radio frequency band at block 918. Following block 918, at block 920 communications between the first device and the second device are performed utilizing the interim non-priority services communications channel utilizing the second radio frequency band.

At block 922, an availability of a newly available priority services channel in the first radio frequency band is monitored while utilizing the interim non-priority services communications channel. At decision block 924, it is determined whether an availability of the newly available priority services channel in the first radio frequency band has been identified.

If no at decision block 924, the process returns to block 920. If yes at decision block 924, at block 926 a handover of communications between the first device and the second device is performed from the interim non-priority services communications channel to the newly available priority services communications channel. At block 928, communications between the first device and the second device are performed utilizing the newly established priority services communications channel utilizing the first radio frequency band.

Figure 10:
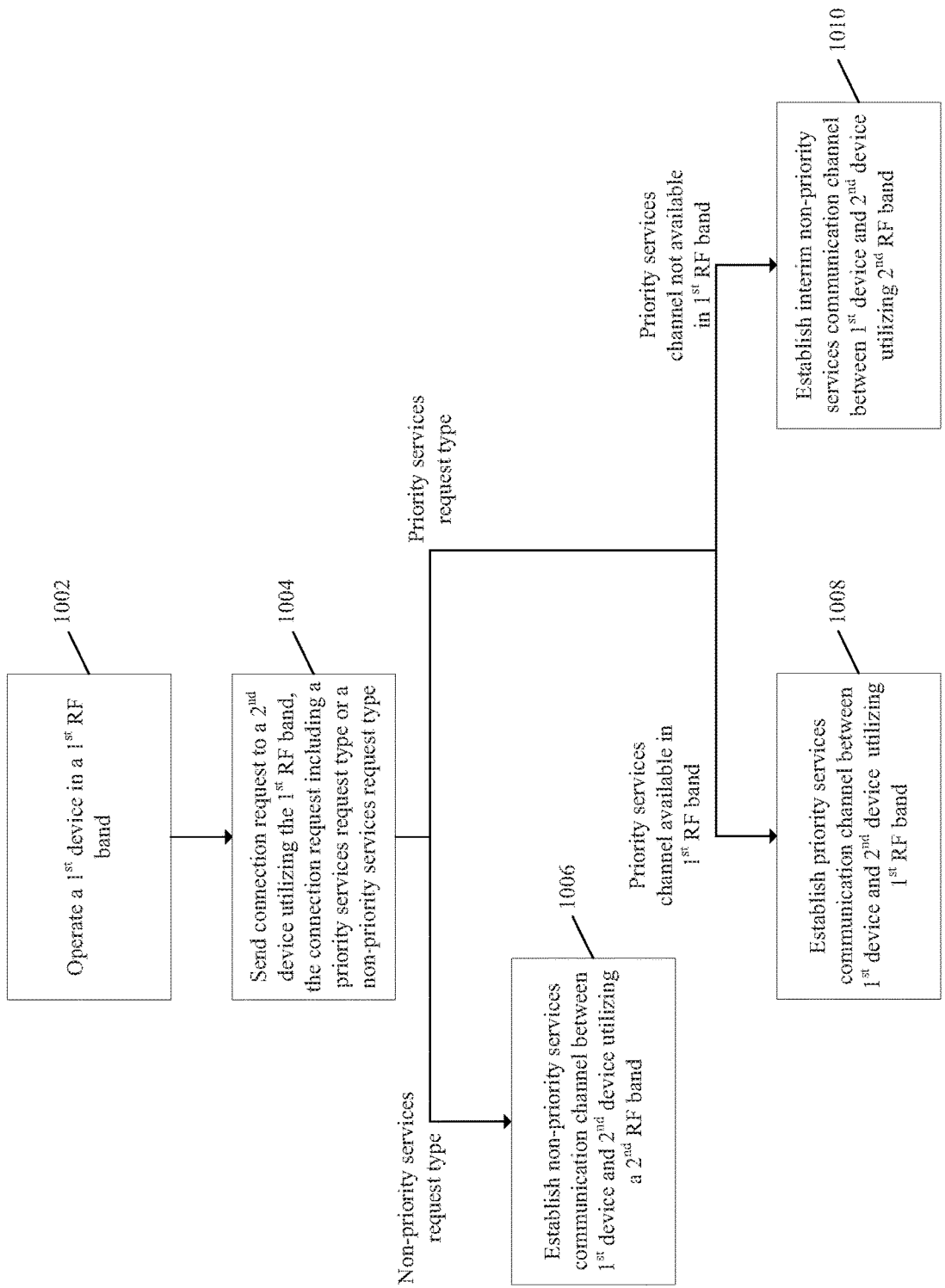
FIG. 10 is a flow diagram illustrating a process for multiple radio frequency band operation based on service request type in a further example.

FIG. 10 is a flow diagram illustrating a process for multiple radio frequency band operation based on service request type in a further example. At block 1002, a first device is operated in a first radio frequency band. In one example, operating the first device in the first radio frequency band includes transmitting during an idle mode a beacon on at least one channel in the first radio frequency band.

At block 1004, a connection request is sent to a second device from the first device utilizing the first radio frequency band. The connection request includes a priority services request type or a non-priority services request type. In one example, the priority services request type is a request for voice telephony communication services. The non-priority services request type is a request for non-telephony data services. In one example, the first device includes a portable part device and the second device includes a radio fixed part device. In a further example, the first device includes a radio fixed part device and the second device includes a portable part device.

If the connection request includes a non-priority services request type, at block 1006 a non-priority services communications channel is established between the first device and the second device utilizing a second radio frequency band. In one example, the first radio frequency band is a DECT dedicated band and the second radio frequency band is a non-dedicated ISM band. For example, the DECT dedicated band is a first DECT frequency band between 1880-1900 Mhz or a second DECT frequency band between 1920-1930 MHz, and the non-dedicated ISM band is an ISM band between 902-908 MHz.

If the connection request includes a priority services request type and a priority services channel is available in the first radio frequency band, at block 1008 a priority services communications channel is established between the first device and the second device utilizing the first radio frequency band. If the connection request is a priority services request type and a priority services channel is not available in the first radio frequency band, at block 1010 an interim non-priority services communications channel is established between the first device and the second device utilizing the second radio frequency band.

Following establishment of the interim non-priority services communications channel, communications between the first device and the second device are performed utilizing the interim non-priority services communications channel. In one example, an availability of a newly available priority services channel in the first radio frequency band is monitored while utilizing the interim non-priority services communications channel. The availability of a newly available priority services channel in the first radio frequency band is identified. A handover of communications between the first device and the second device from the interim non-priority services communications channel to the newly available priority services communications channel is performed. Following the handover, communications between the first device and the second device are performed utilizing the newly available priority services communications channel.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method for multiple radio frequency band operation comprising:
    operating a first device in a first radio frequency band;
    receiving a connection request at the first device from a second device utilizing the first radio frequency band, wherein the first device comprises a first radio fixed part device and the second device comprises a first portable part device, or the first device comprises a second portable part device and the second device comprises a second radio fixed part device;
    designating the connection request as a priority services request type or a non-priority services request type;
    responsive to designating the connection request as the non-priority services request type, establishing a non-priority services communications channel between the first device and the second device utilizing a second radio frequency band, wherein the second radio frequency band is different from the first radio frequency band;
    responsive to designating the connection request as the priority services request type and determining a suitable priority services channel is available in the first radio frequency band, establishing a priority services communications channel between the first device and the second device utilizing the first radio frequency band;
    responsive to designating the connection request as the priority services request type and determining the suitable priority services channel is not available in the first radio frequency band, establishing an interim non-priority services communications channel between the first device and the second device utilizing the second radio frequency band; and
    performing a handover of communications between the first device and the second device from the interim non-priority services communications channel in the second radio frequency band to a newly available priority services communications channel in the first radio frequency band.

2. The method of claim 1, wherein determining the suitable priority services channel is available in the first radio frequency band comprises monitoring a channel quality for each channel in the first radio frequency band.

3. The method of claim 1, wherein the first radio frequency band comprises a DECT dedicated band and the second radio frequency band comprises a non-dedicated ISM band.

4. The method of claim 3, wherein the DECT dedicated band comprises a first DECT frequency band between 1880-1900 MHz or a second DECT frequency band between 1920-1930 MHz, and the non-dedicated ISM band comprises an ISM band between 902-908 MHz.

5. The method of claim 1, wherein operating the first device in the first radio frequency band comprises: transmitting during an idle mode a beacon on at least one channel in the first radio frequency band.

6. The method of claim 1, wherein designating the connection request as the priority services request type or the non-priority services request type comprises determining whether the connection request comprises a request for voice communication services.

7. The method of claim 1, wherein the priority services request type comprises a request for voice telephony communication services and the non-priority services request type comprises a request for non-telephony data services.

8. The method of claim 7, wherein the request for non-telephony data services comprises a request for sensor data transfer services.

9. A first communications device comprising:
   one or more processors;
   a first radio frequency band transceiver to operate the first communications device in a first radio frequency band;
   a second radio frequency band transceiver to operate the first communications device in a second radio frequency band, wherein the second radio frequency band is different from the first radio frequency band;
   one or more antennas; and
   one or more memories comprising computer-executable instructions stored thereon which, when executed by the one or more processors, cause the one or more processors to perform operations comprising:
      operating the first communications device in the first radio frequency band;
      receiving a connection request at the first communications device from a second communications device utilizing the first radio frequency band, wherein the first communications device comprises a first radio fixed part device and the second communications device comprises a first portable part device, or the first communications device comprises a second portable part device and the second communications device comprises a second radio fixed part device;
      designating the connection request as a priority services request type or a non-priority services request type;
      responsive to designating the connection request as the non-priority services request type, establishing a non-priority services communications channel between the first communications device and the second communications device utilizing the second radio frequency band;
      responsive to designating the connection request as the priority services request type:
         determining whether a priority services channel is available or not available in the first radio frequency band;
         establishing a priority services communications channel between the first communications device and the second communications device utilizing the first radio frequency band responsive to determining the priority services channel is available in the first radio frequency band;
         establishing an interim non-priority services communications channel between the first communications device and the second communications device utilizing the second radio frequency band responsive to determining the priority services channel is not available in the first radio frequency band; and
         performing a handover of communications between the first communications device and the second communications device from the interim non-priority services communications channel in the second radio frequency band to a newly available priority services communications channel in the first radio frequency band.

10. A method for multiple radio frequency band operation comprising:
    operating a first device in a first radio frequency band;
    sending a connection request to a second device from the first device utilizing the first radio frequency band, the connection request comprising a priority services request type or a non-priority services request type, wherein the first device comprises a first radio fixed part device and the second device comprises a first portable part device, or the first device comprises a second portable part device and the second device comprises a second radio fixed part device;
    establishing a non-priority services communications channel between the first device and the second device utilizing a second radio frequency band if the connection request is the non-priority services request type, wherein the second radio frequency band is different from the first radio frequency band; and
    where the connection request comprises the priority services request type, one selected from:
       establishing a priority services communications channel between the first device and the second device utilizing the first radio frequency band following a determination the priority services communications channel is available in the first radio frequency band, and
       establishing an interim non-priority services communications channel between the second device and the first device utilizing the second radio frequency band following a determination the priority services communications channel is not available in the first radio frequency band, and performing a handover of communications between the first device and the second device from the interim non-priority services communications channel in the second radio frequency band to a newly available priority services communications channel in the first radio frequency band.

11. The method of claim 10, wherein the first radio frequency band comprises a DECT dedicated band and the second radio frequency band comprises a non-dedicated ISM band.

12. The method of claim 11, wherein the DECT dedicated band comprises a first DECT frequency band between 1880-1900 Mhz or a second DECT frequency band between 1920-1930 MHz, and the non-dedicated ISM band comprises an ISM band between 902-908 MHz.

13. The method of claim 10, wherein operating the first device in the first radio frequency band comprises: transmitting during an idle mode a beacon on at least one channel in the first radio frequency band.

14. The method of claim 10, wherein the priority services request type comprises a request for voice telephony communication services and the non-priority services request type comprises a request for non-telephony data services.

* * * * *